United States Patent [19]

Watanabe et al.

[11] Patent Number: 4,762,306
[45] Date of Patent: Aug. 9, 1988

[54] HYDRAULIC MOUNTING SYSTEM FOR A POWER UNIT

[75] Inventors: Kenichi Watanabe; Haruyuki Taniguchi, both of Hiroshima, Japan

[73] Assignee: Mazda Motor Corporation, Hiroshima, Japan

[21] Appl. No.: 808,812

[22] Filed: Dec. 13, 1985

[30] Foreign Application Priority Data

Dec. 19, 1984 [JP] Japan .................. 59-268841
Dec. 19, 1984 [JP] Japan .................. 59-268842
Dec. 19, 1984 [JP] Japan .................. 59-268853

[51] Int. Cl.[4] .......................................... B60G 13/08
[52] U.S. Cl. .................. 267/195; 267/140.1; 123/192 R; 123/195 A; 248/562; 248/631; 248/550
[58] Field of Search ............... 267/8 R, 140.1; 188/298; 248/562, 631, 638, 550; 123/192 B, 192 R, 195 A; 137/513.3

[56] References Cited

U.S. PATENT DOCUMENTS

| | | | |
|---|---|---|---|
| 1,435,331 | 11/1922 | Pasco | 137/513.3 |
| 2,391,211 | 12/1945 | White | 137/513.3 |
| 2,421,585 | 6/1947 | Thiry | 267/140.1 |
| 2,457,749 | 12/1948 | Thiry | 267/140.1 |
| 2,705,118 | 3/1955 | Beck | 248/10 |
| 4,159,091 | 6/1979 | LeSalver et al. | |
| 4,516,545 | 5/1985 | Kumagai et al. | 188/298 |
| 4,611,782 | 9/1986 | Ushijima et al. | 267/140.1 |
| 4,611,795 | 9/1986 | Muzechuk | 267/8 R |
| 4,643,405 | 2/1987 | Hofmann et al. | 267/8 R |

FOREIGN PATENT DOCUMENTS

| | | | |
|---|---|---|---|
| 161617 | 9/1983 | Japan . | |
| 199220 | 11/1983 | Japan | 297/140.1 |
| 103045 | 6/1984 | Japan | 267/140.1 |
| 103043 | 6/1984 | Japan | 267/140.1 |
| 603566 | 6/1948 | United Kingdom | 188/298 |

Primary Examiner—Randolph A. Reese
Assistant Examiner—Anthony Knight
Attorney, Agent, or Firm—Fleit, Jacobson, Cohn & Price

[57] ABSTRACT

A mounting system for a vehicle engine including mounting units located at the opposite sides of the engine output shaft. The mounting unit includes a hydraulic chamber filled with hydraulic liquid. The hydraulic chamber of one unit is connected with that of the other unit through a conduit which may be provided with a variable orifice or a valve. The variable orifice or the valve is operated so that the fluid flow through the conduit is restricted or cut-off under a specific rolling frequency range.

22 Claims, 8 Drawing Sheets

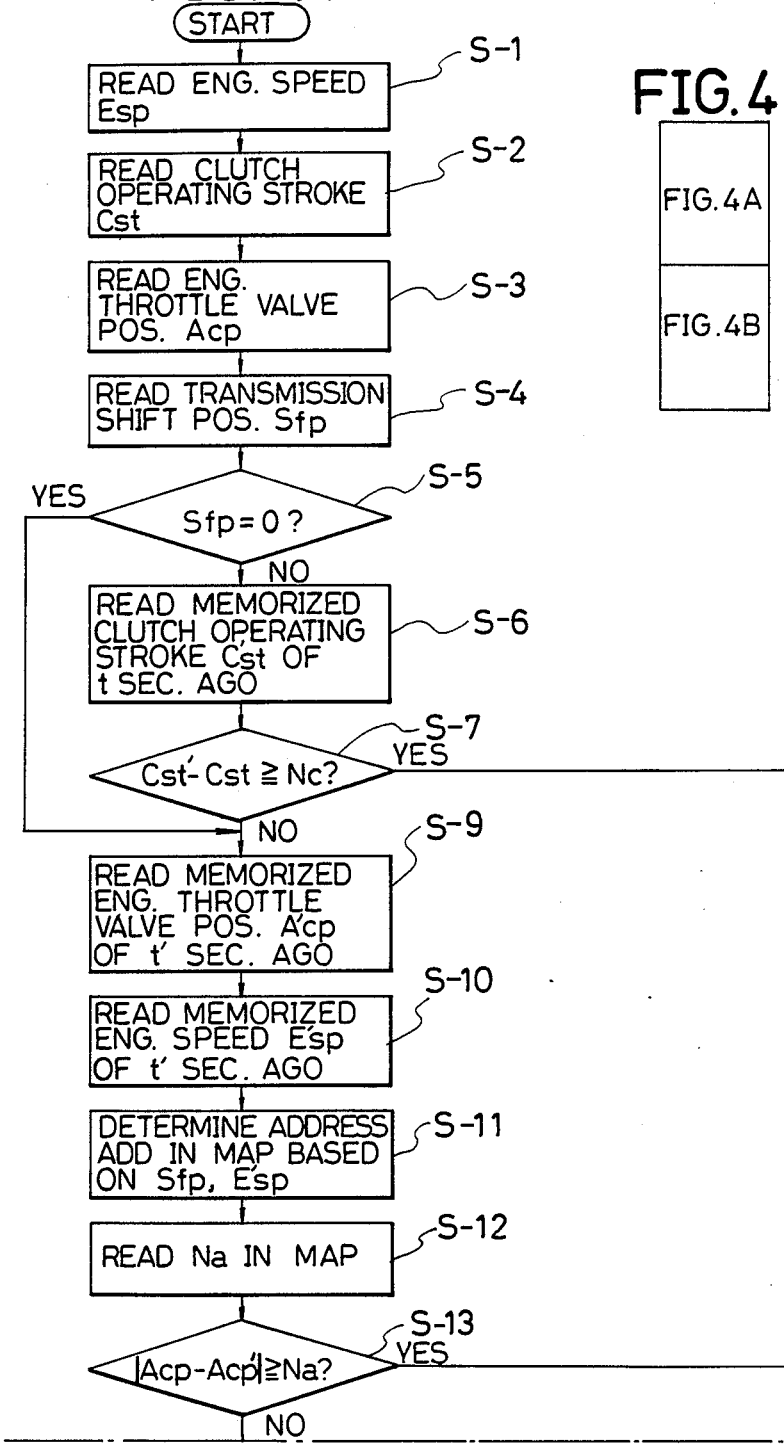
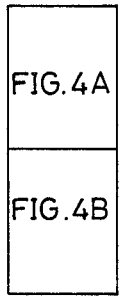
FIG.4A
FIG.4

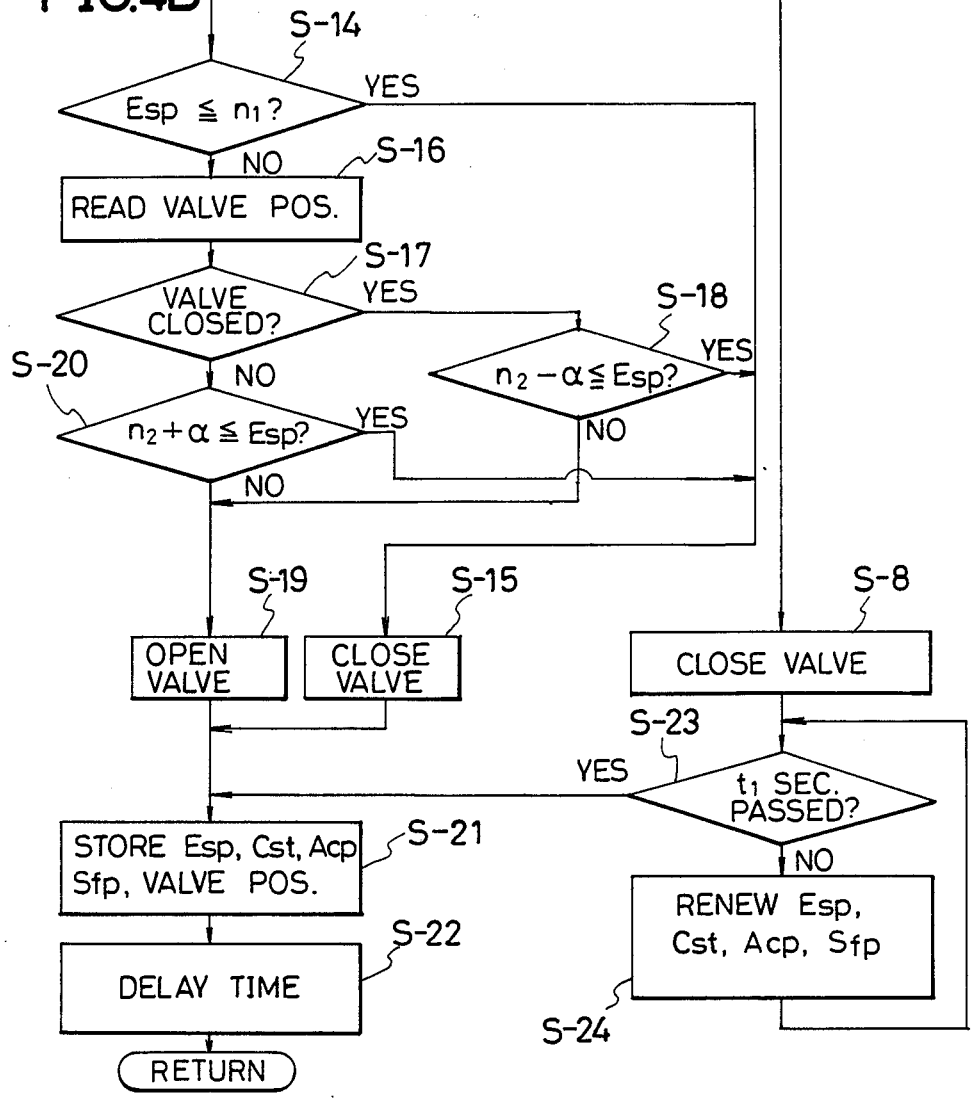

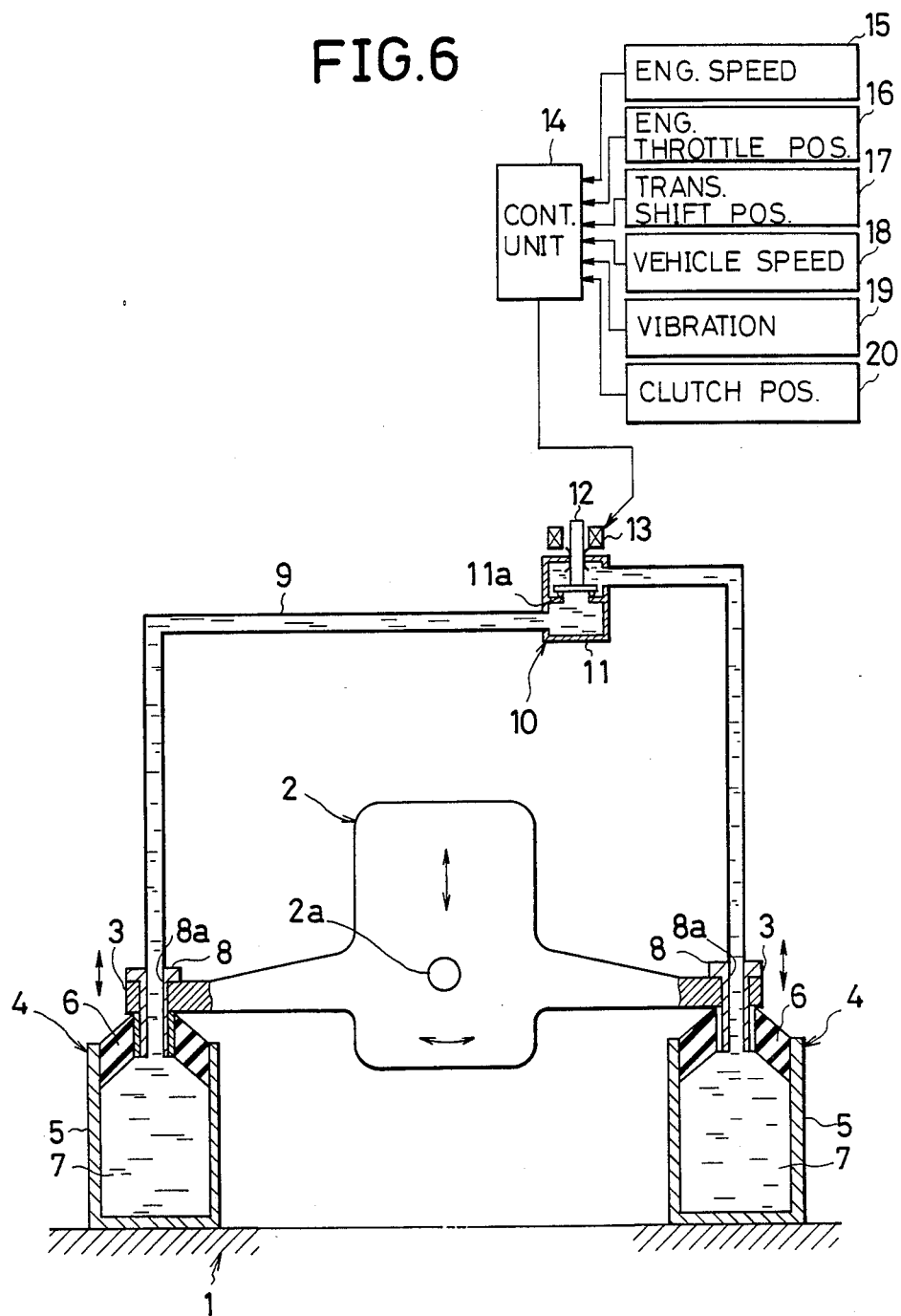

HYDRAULIC MOUNTING SYSTEM FOR A POWER UNIT

BACKGROUND OF THE INVENTION

1. Field of the Invention

The present invention relates to mounting means for a power unit such as an engine, and more specifically, to hydraulic mounting means for a power unit. More specifically, the present invention pertains to mounting means for a power unit which is of a type including a pair of hydraulic mounting units located at the opposite sides of the output shaft of the power unit and having hydraulic chambers connected together by conduit means.

2. Description of the Prior Art

For mounting power units such as vehicle engines on supports such as vehicles bodies, conventional techniques use rubber mounts having spring coefficients which increase as the loads increase. Such rubber mounts are disadvantageous in that the natural frequencies of the mounting means become close to the frequencies of the secondary vibrations of the power units. In order to eliminate the problem, a proposal has been made by the Japanese patent application No. 57-41921 filed on Mar. 17, 1982 and disclosed for public inspection on Sept. 26, 1983 under the disclosure No. 58-161617 to use hydraulic mounting units. According to the proposal, the mounting units are provided at the opposite sides of the power unit and each of the mounting units has an upper and lower hydraulic chambers separated by a flexible partition member which is connected with a leg member provided on the power unit. The upper chamber of one mounting unit is connected with the lower chamber of the other mounting unit through a conduit. Similarly the upper chamber of the other mounting unit is connected with the lower chamber of the one mounting unit. The proposed arrangement can provide an increased resistance to rolling oscillations of the power unit with a relatively soft support against vertical vibrations.

It should however be noted that the proposed arrangement is disadvantageous in that, due to the increased ridigity against the rolling movements, it becomes difficult to isolate torque variations of the power unit. Therefore, the torque variations of the power unit are transmitted to the support without being isolated by the mounting units.

The U.S. Pat. No. 2,705,118 issued to M. G. Beck on Mar. 29, 1955 discloses a resilient mounting system which includes a pair of mounting units located at the opposite sides of the output shaft of an engine and each having a rubber mount provided at a lower side with a hydraulic chamber. The hydraulic chamber of one mounting unit is connected with the hydraulic chamber of the other mounting unit through a conduit which may be provided with an orifice so that torsional vibrations are absorbed by the damping effect of the orifice. As described in the U.S. patent, the proposal is intended to provide an essentially rigid support insofar as the vertical translation is concerned but to make the torsional or rolling spring coefficient of the mounting system relatively small. The inventors have found however that is is not easy to decrease the rolling spring coefficient in this type of mounting system, because the rolling spring coefficient changes significantly in accordance with the frequency of the engine torque variations. It is understood that this tendency is produced due to the resonance of the fluid pressure in the conduit and has the following characteristics.

(1) Under a low frequency region, it is possible for the hydraulic fluid to move through the conduit connecting the hydraulic chambers of the mounting units so that the rolling spring coefficient is substantially equal to the static spring coefficient of the system having the conduit. Then, the rolling spring coefficient decreases in response to an increase in the frequency.

(2) As the frequency reaches a certain value fa, the rolling spring coefficient shows a minimum value and then increases relatively rapidly as the frequency increases beyond the aforementioned certain value. This tendency is understood as being produced by the fact that the inertia of the hydraulic fluid tends to prevent the flow through the conduit. At a second value fe of the frequency, the rolling spring coefficient becomes equal to the static spring coefficient of the system wherein the communication conduit is omitted.

(3) The rolling spring coefficient increases further as the frequency increases beyond the aforementioned second value to a peak value which occurs at a third value fn of the frequency.

(4) Then, the rolling spring coefficient decreases as the frequency increases beyond the third value fn and finally approaches the static spring coefficient of the system wherein the communication conduit is omitted.

It will therefore be understood that, in the mounting system as disclosed by the U.S. Pat. No. 2,705,118, it is impossible to maintain the rolling spring coefficient to a desirably low value throughout a wide frequency range.

SUMMARY OF THE INVENTION

It is an object of the present invention to provide engine mounting means in which the rolling spring coefficient can be decreased satisfactorily throughout a relatively wide frequency range.

Another object of the present invention is to provide power unit mounting means in which the rolling spring coefficient can be maintained in a relatively low range throughout the operation of the power unit.

According to the present invention, the above and other objects can be accomplished by mounting means for a power unit having an output shaft, the mounting means comprising mounting units located at the opposite sides of the output shaft for supporting the power unit on a base, each of said mounting units including resilient means between said power unit and said base to provide a resilient support for the power unit and hydraulic chamber means provided adjacent to the resilient means to apply a hydraulic pressure to the resilient means, the hydraulic chamber means in said mounting units being connected together by conduit means, said conduit means having flow control means for controlling hydraulic fluid flow through the conduit means. The flow control means may be in the form of a variable orifice or a shut-off valve. Electronic control means may be provided for controlling the operation of the flow control means in accordance with the operating condition of the power unit.

According to the features of the present invention, the flow control means is opened or operated so that the flow is increased under the rolling frequency wherein the rolling spring coefficient is lower than that of the system having no communication conduit. Under the rolling frequency wherein the rolling spring coefficient is higher than that of the system having no communication conduit, the flow control means is closed or operated so that the flow is increased. With this control, it becomes possible to maintain the rolling spring coefficient at a low level throughout a relatively wide frequency range.

The above and other objects and features of the present invention will become apparent from the following descriptions of preferred embodiments taking reference to the accompanying drawings.

BRIEF DESCRIPTION OF THE DRAWINGS

FIGS. 4A and B is a program flow chart showing the operations of the control unit;

FIG. 6 is a sectional view similar to FIG. 1 but showing another embodiment of the present invention;

DESCRIPTION OF THE PREFERRED EMBODIMENT

Figure 1:
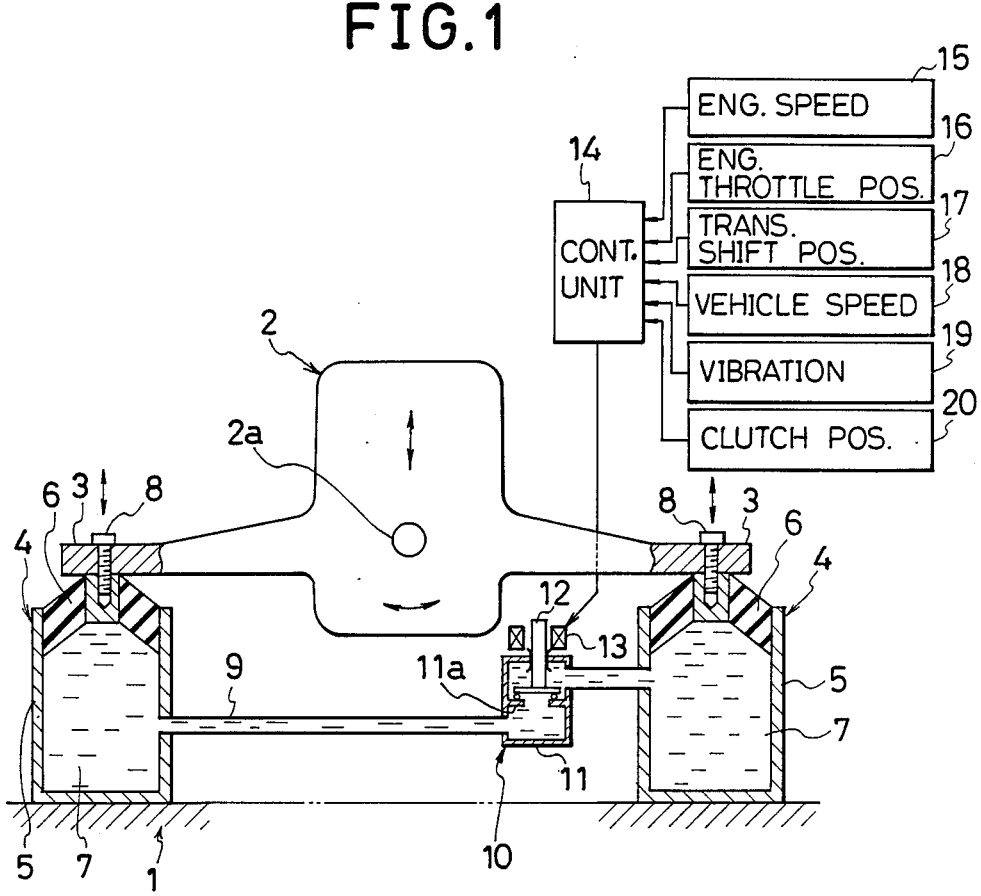
FIG. 1 is a sectional view of the engine mounting system in accordance with one embodiment of the present invention.

Referring to FIG. 1, there is shown a vehicle engine mounting system with which an engine 2 having an output shaft 2a is mounted on a vehicle body 1. The engine 2 has mounting arms 3 extending in the opposite directions with respect to the output shaft 2a. Each of the mounting arms 3 is supported through a mounting unit 4 on the vehicle body 1. The mounting unit 4 includes a mounting rubber 6 attached to one end of a cylindrical case 5 which is secured at the other end to the vehicle body 1. The mounting rubber 6 is connected by means of a bolt 8 with the mounting arm 3.

In the casing 5, there is defined a hydraulic chamber 7 which is filled with non-compressible hydraulic liquid. The hydraulic chambers 7 are connected together by a conduit 9 which is provided with a solenoid valve 10. The solenoid valve 10 includes a valve casing 11 having a valve seat 11a and a valve member 12 adapted for engagement with the valve seat 11a. The valve member 12 is urged by means of a spring (not shown) toward a closed position and a solenoid 13 is provided for forcing the valve member 12 toward an open position when energized. The arrangement is such that the valve member 12 is forced firmly toward the valve seat 11a when the valve member 12 is in the closed position under the hydraulic pressure produced by the reaction force of the forward tractive torque of the engine 2. An electronic control unit 14 is provided for controlling the operation of the solenoid valve 10. The vehicle is provided with an engine speed detector 15, an engine throttle valve position detector 16, a transmission position detector 17, a vehicle speed detector 18, an engine vibration detector 19 and an engine clutch operations detector 20. The output signals of these detectors are applied to the control unit 14 which then judges the operating conditions and produces a signal for operating the solenoid value 10 in accordance with the vehicle operating conditions.

In operation, vertical oscillations of the engine 2 are resisted by the hydraulic fluid in the chambers 7 so that vertical movements of the engine 2 are allowed only through deformations of the mounting rubbers 6. Therefore, a relatively hard support is provided. Under a rolling movement of the engine 2, the hydraulic fluid is moved through the conduit 9 from one chamber 7 to the other so that the rolling movement of the engine 2 is resisted only by the mounting rubbers 6. Therefore, a relatively soft support is provided for rolling movements of the engine 2.

Figure 2:
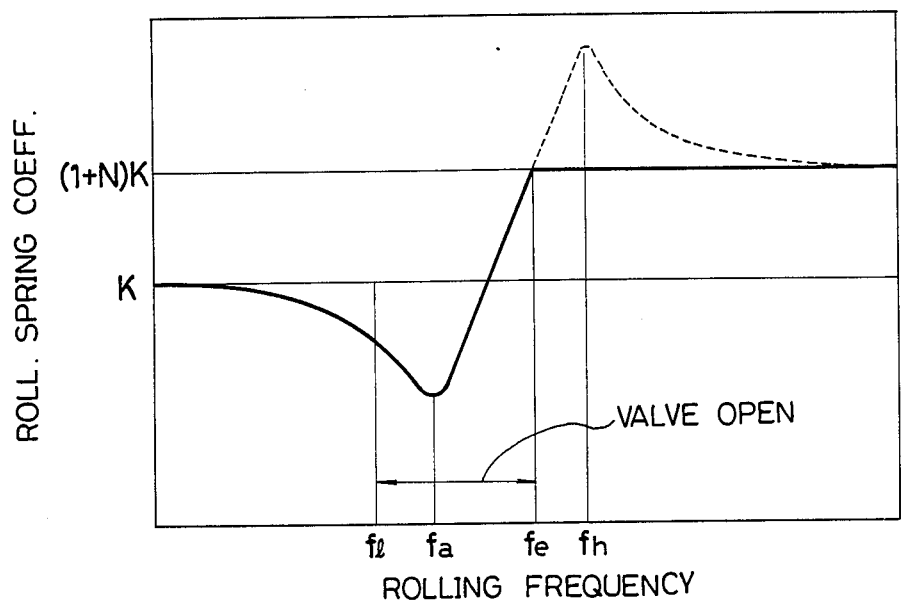
FIG. 2 is a diagram showing the relationship between the rolling spring coefficient and the frequency of the vibration.

As already described, the rolling spring coefficient changes depending on the rolling frequency. As shown in FIG. 2, the static rolling coefficient K of the system having the communication conduit is lower than the coefficient $(1+N)K$ of the system having no such communication conduit. Under the rolling frequency fa, the rolling spring coefficient shows the minimum value whereas it becomes equal to the static coefficient $(1+N)K$ of the system having no communication passage under the rolling frequency fe. Further, the rolling spring coefficient shows a peak value under the rolling frequency fn. Thereafter, the rolling spring coefficient decreases to the coefficient $(1+N)K$ of the system having no communication conduit.

Figure 3:
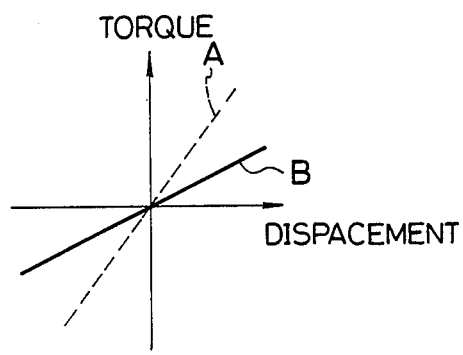
FIG. 3 is a diagram showing the relationship between the engine output torque and the roll angle.

When the engine output torque is increased for acceleration, the volume of one hydraulic chamber 7 tends to decreases whereas the volume of the other hydraulic chamber 7 tends to increase correspondingly. This will cause a fluid flow through the conduit 9 from the one chamber 7 to the other chamber 7. Thus, the relationship between the torque and the engine roll angle changes as shown by a line B in FIG. 3. Where the hydraulic chambers 7 are not connected together by the conduit 9, the roll angle changes as shown by a line A in FIG. 3. It will therefore be understood that the rolling rigidity is significantly decreased by the conduit 9.

Figure 5:
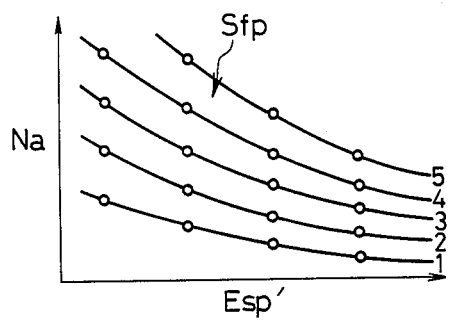
FIG. 5 is a diagram showing an example of memory map for determining the value operating reference value Na.

Referring now to FIG. 4 which shows the operation of the control unit 14, the control unit 14 at first reads the engine speed Esp, the engine clutch operating stroke Cst, the engine throttle valve position Acp and the transmission shift position Sfp in the step S-1, S-2, S-3 and S-4, respectively. Then, a judgement is made in step S-5 as to whether the transmission is in the neutral position or not. If the transmission is not in the neutral position, the control unit 14 reads memory of the clutch operating stroke C'st at t seconds before the instant cycle in step S-6. Then, a calculation is made to obtain the difference between the values C'st and Cst. The difference is compared in step S-7 with a predetermined reference value Nc. If the difference between the values C'st and Cst is not smaller than the reference value Nc, it is judged that the clutch is rapidly engaged so that there is a possibility of the engine output torque being abruptly changed. Then, the step S-8 is carried out to de-energize and close the solenoid valve 10. When it is judged that the difference between the values C'st and Cst is smaller than the reference value Nc, the step S-9 is carried out to read memory of the throttle valve position A'cp in t' seconds before the instant cycle. Thereafter, step S-10 is carried out to read memory of the engine speed E'sp in t' seconds before the instant cycle. Then, an address Add is obtained based on the transmission shift position Sfp and the engine speed E'sp in the memory map shown in FIG. 5 in step S-11 and the value Na is read in the map of FIG. 5 in step S-12. Thereafter, a calculation is carried out in step 13 to obtain a difference between the values Acp and A'cp and the difference is compared with the value Na. When the absolute value of the difference between the values Acp and A'cp is not smaller than the value Na, it is judged that the position of the engine throttle valve is abruptly changed and that there will be an abrupt change in the engine output torque. Then, the procedure is proceeded to the step S-8 to close the solenoid valve 10.

If the judgement in the step S-5 is that the transmission is in neutral, the process is proceeded to the step S-9. If the judgement in the step S-13 is that the absolute value of the difference between the values Acp and A'cp is smaller than the value Na, the step S-14 is carried out to judge as to whether the engine speed Esp is not larger than a predetermined value n1. If the answer is YES, the step S-15 is carried out to close the solenoid valve 10. If the answer in the step S-14 is NO, the position of the solenoid valve 10 is read in step S-16 and a judgement is made in step S-17 as to whether the solenoid valve 10 is closed. When it is judged that the solenoid valve 10 is closed, a judgement is made in step S-18 as to whether a value n2-α is not larger than the engine speed Esp. The value n1 is determined so that it is lower than an allowable lower limit of the engine idling speed whereas the value n2 is determined so that it is close to an allowable upper limit of the engine idling speed. The value α is provided for obtaining a hysteresis in the control of the valve operation. When the value n2-α is not larger than the engine speed Esp, it is judged that the engine speed is high so that the solenoid valve 10 must be maintained in the closed position. Therefore, the process is proceeded to the step S-15. When the value n2-α is larger than the engine speed Esp, it is judged that the engine speed is low so that the solenoid valve 10 shall be opened. Thus, the step S-19 is carried out to energize and open the solenoid valve 10.

When it is judged in the step S-17 that the solenoid valve 10 is open, a judgement is made in step S-20 as to whether the engine speed Esp is larger than a value n2+α. If the engine speed Esp is larger than the value n2+α, the step S-15 is carried out to close the solenoid valve 10. If the engine speed Esp is smaller than the value n2+α, the step S-19 is carried out to maintain the solenoid valve 10 in the open position.

After either the step S-15 or S-19, step S-21 is carried out to store the values Esp, Cst, Acp, Sfp and the position of the solenoid valve 10. Thereafter, a delay time is provided in step S-22 before the procedure is repeated so that input signals from the detectors are taken in proper timings. After the step S-8, a judgement is made in step S-23 as to whether a time t1 has passed. If the time t1 has not passed yet, the values Esp, Cst, Acp and Sfp are replaced by new values in Step S-24 and the step S-23 is repeated. When the time t1 has passed, the procedure is proceeded to the step S-21.

In the procedures described above, it will be understood that steps S-6 through S-13 perform a control in which an abrupt change in the engine output torque is predicted and the solenoid valve 10 is closed under a condition wherein an abrupt change in the engine output torque is likely to occur. In the steps S-14 through S-20, the solenoid valve 10 is controlled in accordance with the engine speed Esp which is proportional to the rolling frequency. It is preferred that the conduit 9 is dimensioned so that the natural frequency of the fluid in the conduit 9 is higher than the lowest frequency of the vibrations due to variations in output torque of the engine under the speed n2. Then, the value n1 may correspond to the rolling frequency f1 as shown in FIG. 2 and the value may correspond to the rolling frequency fe, so that the solenoid valve 10 is opened in the frequency range between f1 and fe.

Referring to FIG. 6 which shows a further embodiment of the present invention, the embodiment shown therein is different from the embodiment shown in FIG. 1 in that the conduit 9 is connected with the hydraulic chambers 7 through passages 8a formed in the bolts 8 connecting the mounting arms 3 with the mounting rubbers 6. The arrangement is suitable for a structure wherein the solenoid valve 10 is mounted on the body of the engine 2.

Figure 7:
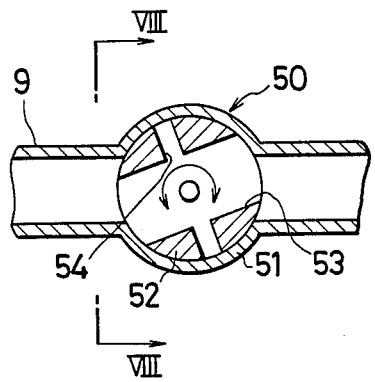
FIG. 7 shows a further embodiment.
Figure 8:
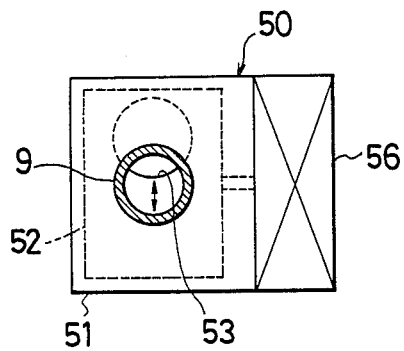
FIG. 8 is a sectional view taken along the line VIII—VIII in FIG. 7.

Referring to FIGS. 7 and 8, there is shown an embodiment wherein the solenoid valve 10 in the previous embodiments is substituted by a variable orifice assembly 50 which includes a casing 51 and a rotor 52 disposed in the casing 51. The rotor 52 has an unrestricted passage 53 and an orifice passage 54. Motor 56 is provided for rotating the rotor 52. The rotor 52 is positioned so that the unrestricted passage 53 is normally communicated with the conduit 9 but the motor is operated to bring the orifice passage 54 into communication with the conduit 9 in the frequency range wherein the rolling spring coefficient exceeds the value $(1+N)K$. With this control, it becomes possible to suppress the peak value of the coefficient.

Figure 9:
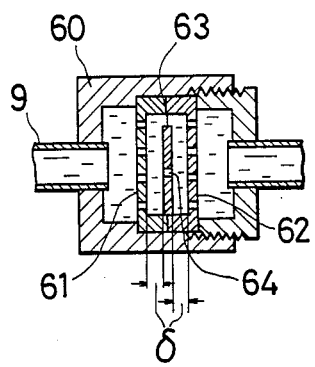
FIGS. 9 through 11 show various examples of the flow control means.

Referring to FIG. 9, there is shown another embodiment of the variable orifice which is controlled in accordance with the amplitude of oscillation of the fluid in the conduit. The variable orifice assembly of this embodiment includes a casing 60 in which a pair of perforated plates 61 and 62 are located in spaced apart relationship. Between the plates 61 and 62, there is a movable orifice plate 63 having an orifice 64. The plate 63 is movable either toward the plate 61 or the plate 62 under the fluid pressure by a distance $\delta$ as shown.

Figure 10:
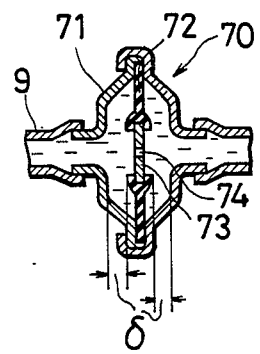
Figure 11:
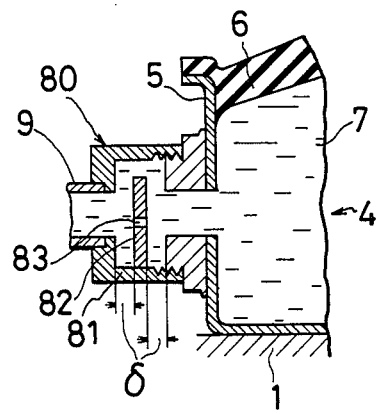

In the embodiment shown in FIG. 10, the orifice assembly includes a casing 70 in which a flexible diaphragm 72 is disposed. The diaphragm 72 carries a plate 73 having an orifice 74. It will be noted that the diaphragm 72 can deflect in either side under the hydraulic pressure by a distance $\delta$. In the embodiment shown in FIG. 11, there is provided an orifice assembly including a casing 80 and a movable plate 82 disposed therein. The plate 82 has an orifice 83 and is movable towards either side by a distance $\delta$.

Figure 12A:
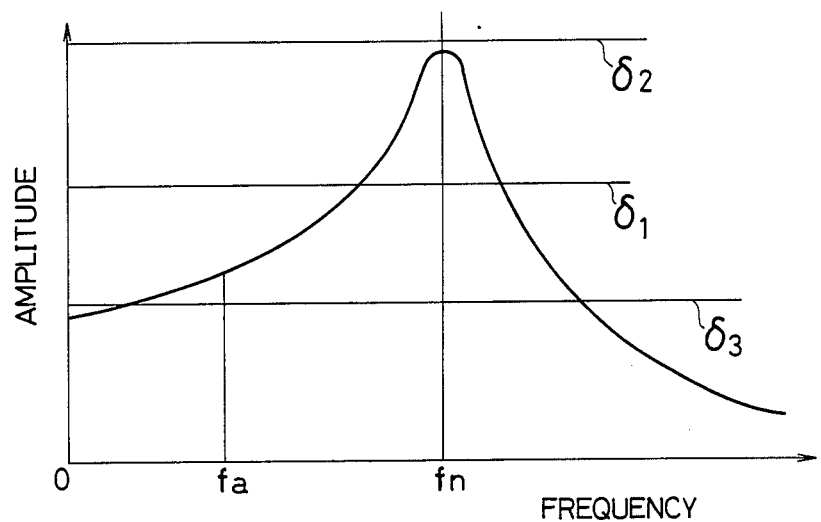
FIG. 12($a$) and ($b$) are diagrams showing the function of the system using the flow control means shown in FIG. 7.
Figure 12B:
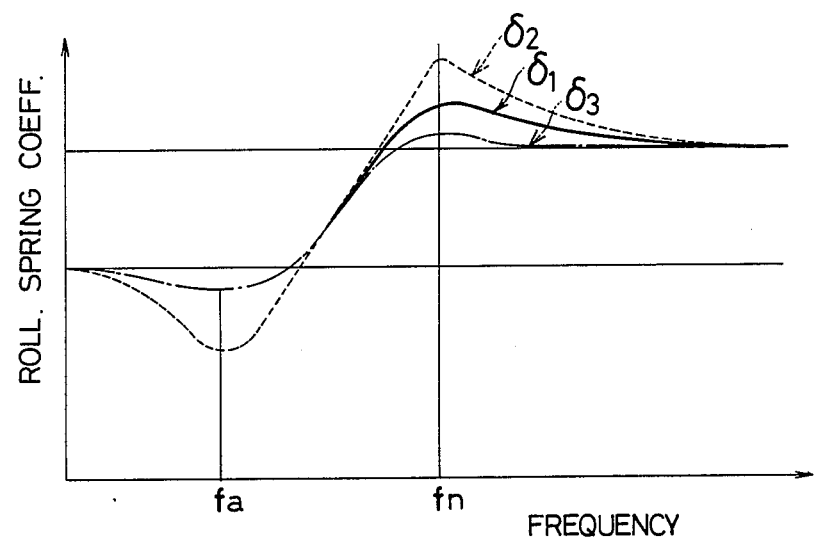

It has been found that the amplitude of the oscillation of the fluid in the conduit 9 changes in accordance with the rolling frequency as shown in FIG. 12(a). When the distance $\delta$ is determined as shown by a line $\delta_1$ in FIG. 12(a), it is possible to suppress the peak value of the rolling spring coefficient as shown by a line $\delta_1$ in FIG. 12(b) without having any influence on the coefficient in a low frequency range. When the distance $\delta$ is increased to a value $\delta_2$, the peak value of the rolling spring coefficient cannot be satisfactorily suppressed as shown by a dotted line $\delta_2$ in FIG. 12(b). When the distance $\delta$ is decreased to a value $\delta_3$, it is possible to suppress the peak value, however, the rolling spring coefficient in the low frequency range is increased. It will therefore be understood that the value $\delta_1$ is the most appropriate distance for the movement of the orifice plate.

The invention has thus been described with reference to specific embodiments, however, it should be noted that the invention is in no way limited to the details of the illustrated structures but changes and modifications may be made without departing from the scope of the appended claims.

What is claimed is:

1. A mounting system for a power unit having an output shaft, the mounting means comprising mounting units located at the opposite sides of the output shaft for supporting the power unit on a base, each of said mounting units including resilient means between said power unit and said base to provide a resilient support for the power unit and hydraulic chamber means containing hydraulic fluid provided adjacent to the resilient means to apply a hydraulic pressure to the resilient means, the hydraulic chamber means in said mounting units being connected together by conduit means, said conduit means having flow control means acting responsive to the operation of the power unit so that the hydraulic fluid flow in said conduit means is more restricted under an operating condition wherein a rolling frequency of the power unit is high than under an operating condition wherein the rolling frequency is low.

2. A mounting system in accordance with claim 1 in which said flow control means is shut-off valve means.

3. A mounting system in accordance with claim 1 in which said flow control means is variable orifice means.

4. A mounting system in accordance with claim 3 in which said variable orifice means includes a movable member having at least two passages of different cross-sectional areas, means for bringing said passages alternately into communication with said conduit means.

5. A mounting system in accordance with claim 3 in which said variable orifice means includes a movable orifice plate and means for limiting movement of the orifice plate within a predetermined distance.

6. A mounting system in accordance with claim 1 which includes electronic control means for controlling the flow control means.

7. A mounting system in accordance with claim 1 in which an electronic control means includes means for detecting rolling frequency of the power unit and producing a control signal for operating the flow control means in accordance with the rolling frequency.

8. A mounting system in accordance with claim 1 in which an electronic control means includes means for detecting rolling frequency of the power unit and producing a control signal for operating the flow control means to decrease fluid flow through the conduit means when the rolling frequency is above a predetermined value.

9. A mounting system in accordance with claim 1 in which said resilient means is connected with said power unit through bolt means, said conduit means being partially formed through said bolt means.

10. A mounting system in accordance with claim 1 in which said conduit means is dimensioned so that the fluid in the conduit means has a natural frequency higher than a lowest frequency of vibrations due to variations in output torque of the power unit under an allowable higher limit of idling speed.

11. A mounting system for a power unit having an output shaft, the mounting means comprising mounting units located at the opposite sides of the output shaft for supporting the power unit on a base, each of said mounting units including resilient means between said power unit and said base to provide a resilient support for the power unit and hydraulic chamber means containing hydraulic fluid provided adjacent to the resilient means to apply a hydraulic pressure to the resilient means, the hydraulic chamber means in said mounting units being connected together by conduit means, said conduit means having flow control means for controlling hydraulic fluid flow through the conduit means acting responsive to the operation of the power unit so that the hydraulic fluid flow in said conduit means is restricted under an operating condition of the power unit wherein an output torque of the power unit changes.

12. A mounting system in accordance with claim 11 in which an electronic control means includes means for detecting output torque of the power unit and producing a control signal for operating the flow control means in accordance with the output torque.

13. A mounting system in accordance with claim 11 in which an electronic control means includes means for detecting output torque of the power unit and producing a control signal for operating the flow control means to decrease fluid flow through the conduit means when the output torque is above a predetermined value.

14. A mounting system in accordance with claim 11 in which said flow control means is shut-off valve means.

15. A mounting system in accordance with claim 11 in which said flow control means is variable orifice means.

16. A mounting system in accordance with claim 11 which includes electronic control means for controlling the flow control means.

17. A mounting system in accordance with claim 11 in which said resilient means is connected with said power unit through bolt means, said conduit means being partially formed through said bolt means.

18. A mounting system in accordance with claim 11 in which said conduit means is dimensioned so that the fluid in the conduit means has a natural frequency higher than a lowest frequency of vibrations due to variations in output torque of the power unit under an allowable higher limit of idling speed.

19. A mounting system for a power unit having an output shaft, the mounting means comprising mounting units located at the opposite sides of the output shaft for supporting the power unit on a base, each of said mounting units including resilient means between said power unit and said base to provide a resilient support for the power unit and hydraulic chamber means containing hydraulic fluid provided adjacent to the resilient means to apply a hydraulic pressure to the resilient means, the hydraulic chamber means in said mounting units being connected together by conduit means, said conduit means having flow control means for controlling hydraulic fluid flow through the conduit means comprised of variable orifice means including a movable orifice plate formed with at least one orifice aperture, said movable orifice plate being movable in a longitudinal direction of the conduit means, stroke limiting means provided at the opposite sides of the movable orifice plate for limiting a stroke of movements of the movable orifice plate whereby the hydraulic fluid flow is not restricted when the movable orifice plate is in an intermediate position of the stroke but is restricted when the movable orifice plate is in a limit position wherein it is engaged with the stroke limiting means.

20. A mounting system in accordance with claim 19 in which said variable orifice means includes an orifice plate carried by a flexible diaphragm and means for limiting deflection of the diaphragm within a predetermined distance.

21. A mounting system in accordance with claim 19 in which said movable orifice plate is arranged freely movably in the longitudinal direction of the conduit means, said stroke limiting means includes a pair of perforated plates spaced apart from each other and located at the opposite sides of the movable orifice plate.

22. A mounting system in accordance with claim 19 in which said conduit means is dimensioned so that the fluid in the conduit means has a natural frequency higher than a lowest frequency of vibrations due to variations in output torque of the power unit under an allowable higher limit of idling speed.

* * * * *